(12) United States Patent
Tabushi et al.

(10) Patent No.: US 12,362,360 B2
(45) Date of Patent: Jul. 15, 2025

(54) POSITIVE ELECTRODE NCM-BASED ACTIVE MATERIAL, POSITIVE ELECTRODE, AND BATTERY

(71) Applicant: Prime Planet Energy & Solutions, Inc., Tokyo (JP)

(72) Inventors: Akihiro Tabushi, Kasai (JP); Hiroki Watanabe, Akashi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 18/416,471

(22) Filed: Jan. 18, 2024

(65) Prior Publication Data
US 2024/0250256 A1 Jul. 25, 2024

(30) Foreign Application Priority Data
Jan. 20, 2023 (JP) .................. 2023-007039

(51) Int. Cl.
| | |
|---|---|
| *C01G 53/502* | (2025.01) |
| *C01G 53/50* | (2025.01) |
| *C01G 53/504* | (2025.01) |
| *H01M 4/525* | (2010.01) |
| *H01M 4/02* | (2006.01) |

(52) U.S. Cl.
CPC ............ *H01M 4/525* (2013.01); *C01G 53/50* (2013.01); *C01G 53/502* (2025.01); *C01G 53/504* (2025.01); *C01P 2002/50* (2013.01); *C01P 2002/60* (2013.01); *C01P 2004/50* (2013.01); *C01P 2006/40* (2013.01); *H01M 2004/021* (2013.01); *H01M 2004/028* (2013.01)

(58) Field of Classification Search
CPC ............ C01P 2002/60; C01P 2004/64; C01G 53/005; C01G 53/502; C01G 53/504
See application file for complete search history.

(56) References Cited

U.S. PATENT DOCUMENTS

| | | |
|---|---|---|
| 2002/0142222 A1 | 10/2002 | Nishida et al. |
| 2013/0323606 A1 | 12/2013 | Yoshida et al. |
| | (Continued) | |

FOREIGN PATENT DOCUMENTS

| | | | | |
|---|---|---|---|---|
| CN | 111106345 A | * | 5/2020 | |
| CN | 112201784 A | * | 1/2021 | ........ H01M 10/0525 |
| | (Continued) | | | |

OTHER PUBLICATIONS

Translation CN 111106345 A (Year: 2020).*
Translation CN-112201784 A (Year: 2021).*

*Primary Examiner* — Hoa (Holly) Le
(74) *Attorney, Agent, or Firm* — Finnegan, Henderson, Farabow, Garrett and Dunner LLP

(57) ABSTRACT

The present disclosure relates to: a positive electrode NCM-based active material in which a crystallite size is 460 Å or more; a positive electrode including the positive electrode NCM-based active material; and a battery including the positive electrode. According to the present disclosure, there are provided: the positive electrode NCM (nickel-cobalt-manganese)-based active material that can exhibit an improved low-temperature low-SOC output property as well as high thermal stability; the positive electrode including the positive electrode NCM-based active material; and the battery including the positive electrode.

6 Claims, 3 Drawing Sheets

(56) References Cited

U.S. PATENT DOCUMENTS

| | | | |
|---|---|---|---|
| 2016/0372749 A1 | 12/2016 | Iida et al. | |
| 2017/0237069 A1 | 8/2017 | Takamori et al. | |
| 2017/0358798 A1 | 12/2017 | Kageura et al. | |
| 2018/0026265 A1 | 1/2018 | Kajiyama et al. | |
| 2018/0145321 A1* | 5/2018 | Yamauchi | C01G 53/006 |
| 2021/0226211 A1 | 7/2021 | Aoki et al. | |
| 2021/0408538 A1 | 12/2021 | Aoki et al. | |
| 2022/0293932 A1 | 9/2022 | Yoshikawa et al. | |
| 2023/0163294 A1 | 5/2023 | Nagao | |
| 2023/0378455 A1* | 11/2023 | Koshika | H01M 4/485 |
| 2024/0258516 A1 | 8/2024 | Watanabe et al. | |

FOREIGN PATENT DOCUMENTS

| | | |
|---|---|---|
| CN | 114864923 A | 8/2022 |
| JP | 2002-298846 A | 10/2002 |
| JP | 2012-022896 A | 2/2012 |
| JP | 2015-018678 A | 1/2015 |
| JP | 2016-207479 A | 12/2016 |
| JP | 2017-162790 A | 9/2017 |
| JP | 2019-186175 A | 10/2019 |
| JP | 2021-177460 A | 11/2021 |
| JP | 2024-102947 A | 8/2024 |
| WO | WO 2012/124240 A1 | 9/2012 |
| WO | WO 2016/060105 A1 | 4/2016 |
| WO | WO 2016/104488 A1 | 6/2016 |
| WO | WO 2016/133042 A1 | 8/2016 |
| WO | WO 2020/044614 A1 | 3/2020 |
| WO | WO 2020/110590 A1 | 6/2020 |

* cited by examiner

POSITIVE ELECTRODE NCM-BASED ACTIVE MATERIAL, POSITIVE ELECTRODE, AND BATTERY

CROSS REFERENCE TO RELATED APPLICATIONS

This nonprovisional application is based on Japanese Patent Application No. 2023-007039 filed on Jan. 20, 2023 with the Japan Patent Office, the entire contents of which are hereby incorporated by reference.

BACKGROUND OF THE INVENTION

Field of the Invention

The present invention relates to a positive electrode NCM-based active material (hereinafter also referred to as an active material), a positive electrode, and a battery.

Description of the Background Art

Japanese Patent Laying-Open No. 2017-162790 discloses a positive electrode active material for a non-aqueous electrolyte secondary battery, wherein an added element substitutes for a nickel atom at a 3b site of a lithium metal composite oxide so as to attain a short bond distance between an oxygen atom and a transition metal atom.

SUMMARY OF THE INVENTION

A positive electrode including a lithium nickel composite oxide is likely to generate heat and release oxygen during charging or discharging, and tends to be low in thermal stability. When an added element substitutes for a nickel element in order to improve thermal stability, an active material including the added element tends to have a low-temperature low-SOC output property lower than that of an active material not including the added element.

An object of the present invention is to provide a positive electrode NCM (nickel-cobalt-manganese)-based active material that can exhibit an improved low-temperature low-SOC output property as well as high thermal stability.

The present invention provides the following positive electrode NCM-based active material, positive electrode, and battery.

[1] A positive electrode NCM-based active material, wherein a crystallite size is 460 Å or more.

[2] The positive electrode NCM-based active material according to [1], wherein the crystallite size is 580 Å or less.

[3] The positive electrode NCM-based active material according to [1] or [2], comprising an aggregated particle in which a diameter D50 of a secondary particle is 14 μm or more and 18 μm or less.

[4] The positive electrode NCM-based active material according to any one of [1] to [3], wherein a weight decrease amount in thermal mass spectrometry at 120 to 600° C. and a temperature increase rate of 5° C./min is 12 mass % or less.

[5] The positive electrode NCM-based active material according to any one of [1] to [4], wherein a weight decrease ratio per minute in thermal mass spectrometry at 120 to 600° C. and a temperature increase rate of 5° C./min is 0.40 mass %/min or less.

[6] A positive electrode comprising the positive electrode NCM-based active material according to any one of [1] to [5].

[7] A battery comprising the positive electrode according to [6].

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
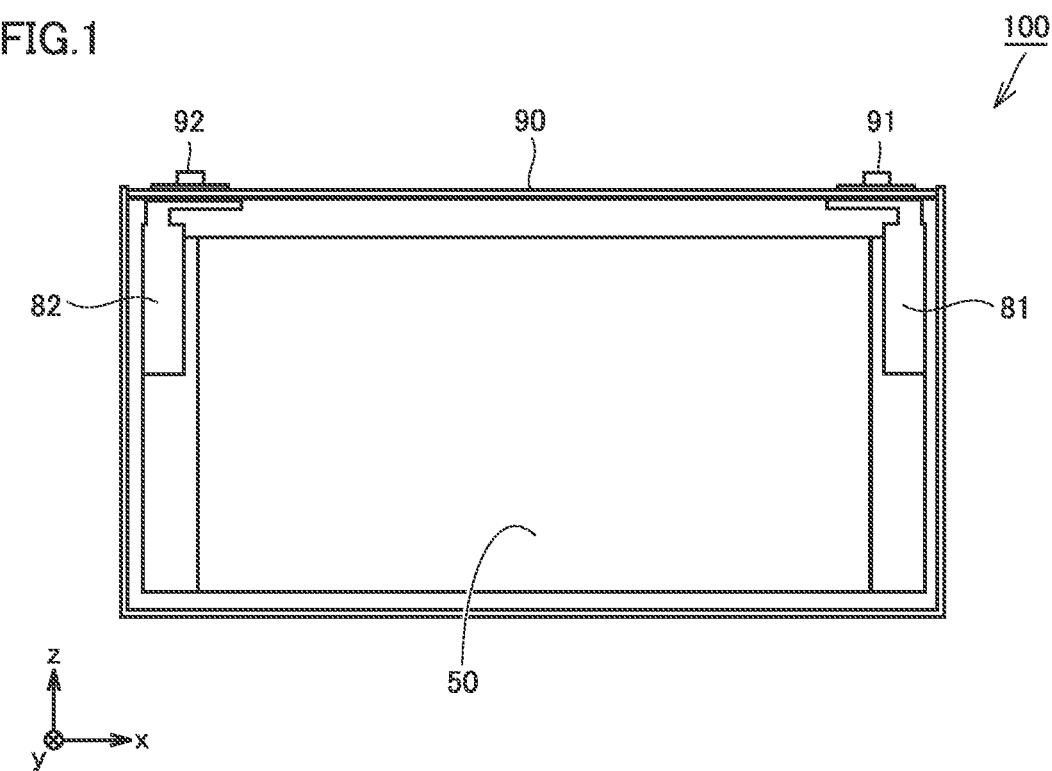
FIG. 1 is a schematic diagram showing an exemplary lithium ion battery according to the present embodiment.

Hereinafter, embodiments of the present invention will be described with reference to figures, but the present invention is not limited to the below-described embodiments. In each of all the figures described below, a scale is appropriately adjusted to facilitate understanding of each component, and the scale of each component shown in the figures does not necessarily coincide with the actual scale of the component.

<Active Material>

An active material includes one or more compounds each containing nickel, cobalt, and manganese. Respective content ratios of nickel with respect to the metal elements other than lithium in the active material may be, for example, 50 mol % or more and 60 mol % or more, and are preferably 60 mol % or more and 70 mol % or more. Each of the compounds each containing nickel, cobalt and manganese preferably includes a nickel-cobalt-manganese composite hydroxide, and more preferably includes a lithium-nickel-cobalt-manganese composite oxide. The nickel-cobalt-manganese composite hydroxide may be obtained by, for example, a co-precipitation method or the like. The nickel-cobalt-manganese composite hydroxide may be, for example, a compound represented by the following general formula: $Ni_xCo_yMn_z(OH)_2$ (where x+y+z=1). In the lithium-nickel-cobalt-manganese composite oxide, a molar ratio, Li:(Ni+Co+Mn), of lithium to nickel, cobalt and manganese can be, for example, 1.0 to 1.2:1.0. The active material can be used for a lithium ion battery. The lithium ion battery will be described in detail later.

The active material may include, for example, a first lamellar metal oxide. The first lamellar metal oxide is represented by the following formula (1):

$$Li_{1-a1}Ni_{x1}Me^1_{1-x1}O_2 \tag{1}$$

In the formula (1), "a1" satisfies the relation "−0.3≤a1≤0.3", "x1" satisfies the relation "0.5≤x1<1.0", and "$Me^1$" represents at least one selected from a group consisting of Co, Mn, Al, Zr, Ti, V, Cr, Fe, Cu, Zn, B, Mo, Sn, Ge, Nb, and W.

The active material may include, for example, a second lamellar metal oxide. The second lamellar metal oxide is represented by the following formula (2):

$$Li_{1-a2}Ni_{x2}Me^2_{1-x2}O_2 \qquad (2)$$

In the formula (2), "a2" satisfies the relation "−0.3≤a2≤0.3", "x2" satisfies the relation "0.6≤x2≤1.0", and "Me²" represents at least one selected from a group consisting of Co, Mn, Al, Zr, Ti, V, Cr, Fe, Cu, Zn, B, Mo, Sn, Ge, Nb, and W.

In the formulas (1) and (2), for example, the relation "x1<x2" may be satisfied.

The active material may include, for example, at least one selected from a group consisting of $LiNi_{0.8}Co_{0.1}Mn_{0.1}O_2$, $LiNi_{0.7}Co_{0.2}Mn_{0.1}O_2$, $LiNi_{0.7}Co_{0.1}Mn_{0.2}O_2$, $LiNi_{0.6}Co_{0.3}Mn_{0.1}O_2$, $LiNi_{0.6}Co_{0.2}Mn_{0.2}O_2$, $LiNi_{0.6}Co_{0.1}Mn_{0.3}O_2$, and $LiNi_{0.55}Co_{0.20}Mn_{0.25}O_2$. For example, each of a primary particle and a single-particle as described later may include at least one selected from a group consisting of $LiNi_{0.8}Co_{0.1}Mn_{0.1}O_2$, $LiNi_{0.7}Co_{0.2}Mn_{0.1}O_2$, $LiNi_{0.7}Co_{0.1}Mn_{0.2}O_2$, and $LiNi_{0.55}Co_{0.20}Mn_{0.25}O_2$.

In the active material, a crystallite size is 460 Å or more. Since the crystallite size is within the above range, excellent thermal stability can be exhibited. The crystallite size can be found in accordance with a method described in the below-described section "Examples". In the active material, the crystallite size is more preferably 580 Å or less from the viewpoint of the low-temperature low-SOC output property.

When the active material includes a lithium-nickel-cobalt-manganese composite oxide, the active material can be synthesized through, for example, two calcination steps, i.e., a first calcination step of calcining a first mixture including a lithium compound and a transition metal compound, and a second calcination step of calcining a second mixture including the calcined material obtained in the first calcination step and a transition metal compound. The crystallite size can be appropriately controlled by controlling calcination parameters (for example, a calcination temperature, a calcination time, and the like) in each of the first calcination step and the second calcination step.

The active material can include an aggregated particle in which an average particle size D50 of a secondary particle is 14 μm or more and 18 μm or less. Average particle size D50 represents a particle size corresponding to a cumulative particle volume of 50% from the small particle size side with respect to the total particle volume in the volume-based particle size distribution. The average particle size can be measured by a laser diffraction/scattering method.

A primary particle included in the secondary particle is a particle having an external appearance in which no grain boundary can be confirmed in an SEM image of the particle. An average primary particle size represents a distance between two points furthest away from each other on a contour line of the primary particle. The average primary particle size of the primary particle may be, for example, 0.05 μm or more and 0.7 μm or less, or 0.1 μm or more and 0.6 μm or less. When ten or more primary particles randomly extracted from an SEM image of one aggregated particle have an average primary particle size of 0.05 μm to 0.2 μm, it is assumed that all the primary particles included in the aggregated particle have an average primary particle size of 0.05 μm to 0.2 μm. The primary particle may have an average primary particle size of, for example, 0.2 μm to 0.5 μm.

The active material can further include a single-particle. An average particle size D50 of the single-particle may be, for example, 1 μm or more and 20 μm or less, is preferably 1 μm or more and 10 μm or less, and is more preferably 1 μm or more and 5 μm or less. The single-particle may be surface-coated.

In the active material, a weight decrease amount in thermal mass spectrometry at a temperature of 120 to 600° C. and a temperature increase rate of 5° C./min can be 12 mass % or less. Further, in the active material, a weight decrease ratio per minute in thermal mass spectrometry at a temperature of 120 to 600° C. and a temperature increase rate of 5° C./min can be 0.40 mass %/min or less. The thermal mass spectrometry is performed in accordance with a method described in the below-described section "Examples".

The positive electrode including the active material may have a low-temperature low-SOC output resistance of, for example, 4.664 Ω or less, and preferably has a low-temperature low-SOC output resistance of 4.586 Ω or less. The low-temperature low-SOC output resistance is found in accordance with a method described in the below-described section "Examples".

<Lithium Ion Battery>

FIG. 1 is a schematic diagram showing an exemplary lithium ion battery according to the present embodiment. A battery 100 shown in FIG. 1 may be, for example, a lithium ion battery for a main electric power supply, a motive power assisting electric power supply, or the like in an electrically powered vehicle.

Figure 2:
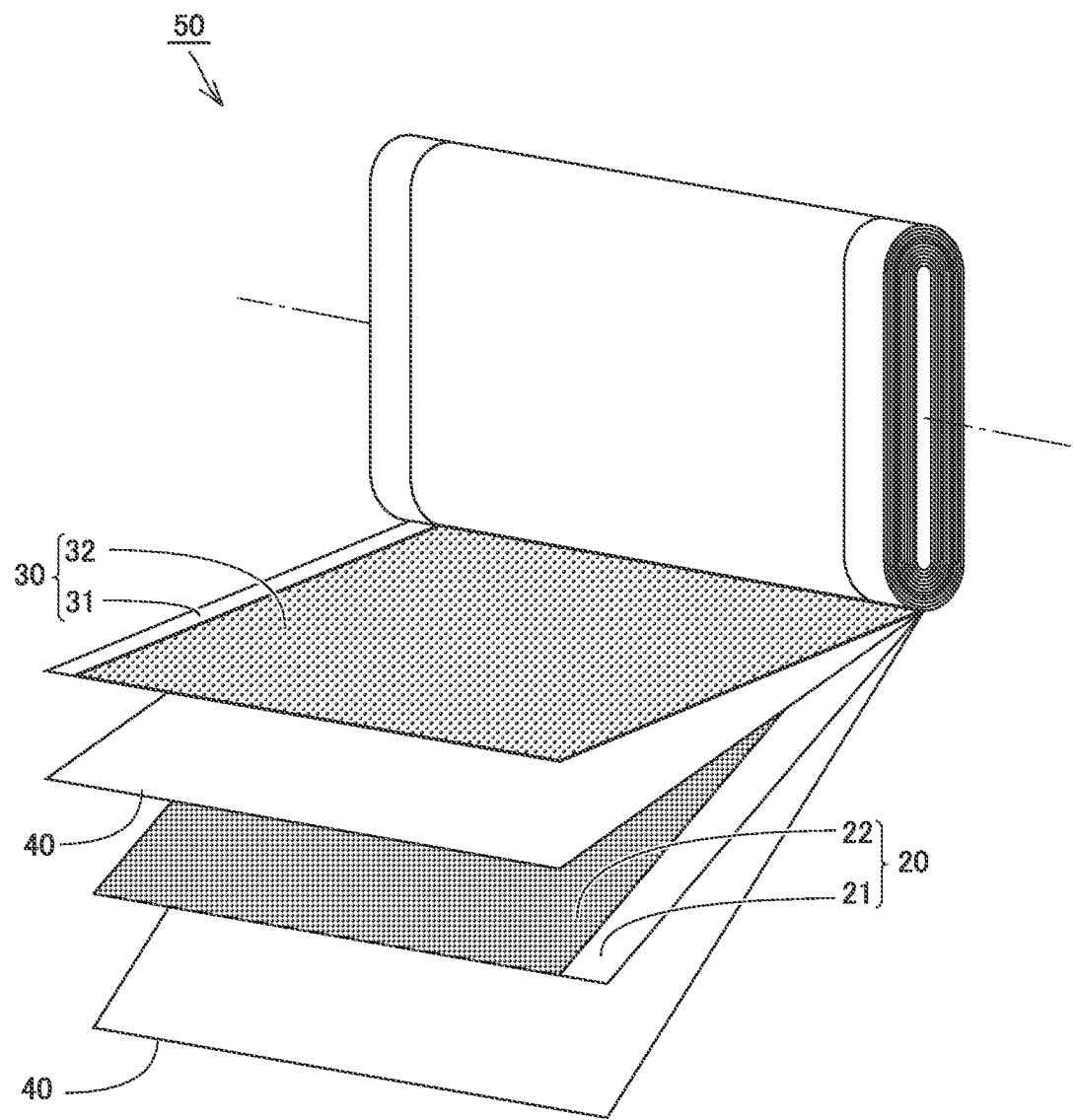
FIG. 2 is a schematic diagram showing an exemplary electrode assembly according to the present embodiment.

Battery 100 includes an exterior package 90. Exterior package 90 accommodates an electrode assembly 50 and an electrolyte (not shown). Electrode assembly 50 is connected to a positive electrode terminal 91 by a positive electrode current collecting member 81. Electrode assembly 50 is connected to a negative electrode terminal 92 by a negative electrode current collecting member 82. FIG. 2 is a schematic diagram showing an exemplary electrode assembly in the present embodiment. Electrode assembly 50 is of a wound type. Electrode assembly 50 includes a positive electrode 20, separators 40, and a negative electrode 30. That is, battery 100 includes positive electrode 20. Positive electrode 20 includes a positive electrode active material layer 22 and a positive electrode substrate 21. Negative electrode 30 includes a negative electrode active material layer 32 and a negative electrode substrate 31.

<Positive Electrode>

Figure 3:
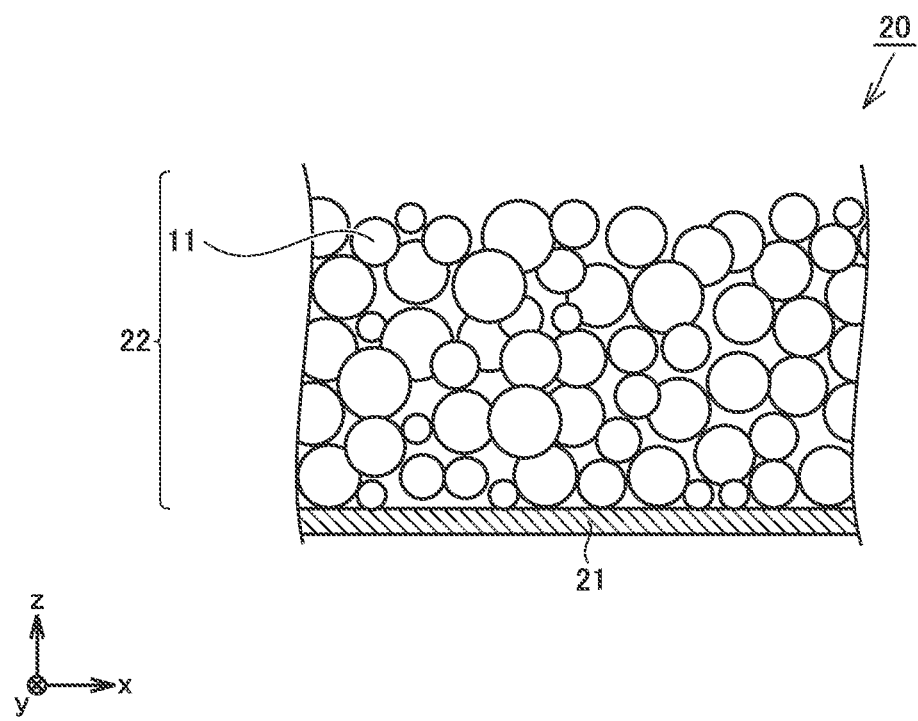
FIG. 3 is a conceptual diagram showing a positive electrode according to the present embodiment.

As shown in FIG. 3, in positive electrode 20, positive electrode active material layer 22 may be formed directly or indirectly on one or both surfaces of positive electrode substrate 21. Positive electrode substrate 21 may be a conductive sheet composed of, for example, an Al alloy foil, a pure Al foil, or the like. Positive electrode active material layer 22 includes an active material 11. Positive electrode active material layer 22 may further include a conductive material, a binder, and the like. Active material 11 includes the positive electrode NCM-based active material described above.

Positive electrode active material layer 22 may have a thickness of, for example, 10 μm to 200 μm. Positive electrode active material layer 22 can have a high density. The density of positive electrode active material layer 22 may be, for example, 3.5 g/cm³ or more, or may be 3.6 g/cm³ or more, or 3.7 g/cm³ or more. Positive electrode active material layer 22 may have a density of, for example, 4.0 g/cm³ or less.

<Method of Manufacturing Positive Electrode>

Figure 4:
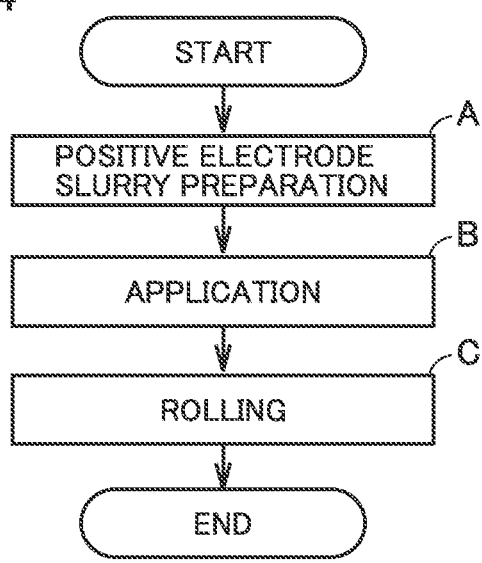
FIG. 4 is a schematic flowchart of a method of manufacturing the positive electrode according to the present embodiment.

As shown in FIG. 4, a method of manufacturing positive electrode 20 according to the present embodiment includes positive electrode slurry preparation (A), application (B) and rolling (C). In the positive electrode slurry preparation (A), a positive electrode slurry including the above-described active material is prepared. The positive electrode slurry is prepared by dispersing the active material in a dispersion medium. In the application (B), the positive electrode slurry is applied to a surface of positive electrode substrate 21, thereby forming positive electrode active material layer 22. In the rolling (C), positive electrode active material layer 22 and positive electrode substrate 21 are rolled, thereby manufacturing positive electrode 20. A raw sheet of positive electrode 20 is manufactured by the rolling. The raw sheet can be cut into a predetermined planar size in accordance with a specification of battery 100.

EXAMPLES

Hereinafter, the present invention will be described in more detail with reference to examples. "%" and "parts" in the examples are mass % and parts by mass unless otherwise stated particularly.

[Production of Positive Electrode for Evaluation on Low-Temperature Low-SOC Output Property]

A positive electrode active material 1 produced in each of Examples and Comparative Examples and a positive electrode active material 2 produced as described below were mixed at a ratio of 1:1, and mixing was performed such that the mixture had 97.5 parts by mass, carbon black serving as a conductive material had 1.5 parts by mass, and polyvinylidene difluoride (PVdF) serving as a binder had 1.0 parts by mass, and an appropriate amount of N-methyl-2-pyrrolidone (NMP) was further added, thereby preparing a positive electrode composite material slurry. The slurry was applied to a current collector composed of an aluminum foil, thereby forming a positive electrode composite material layer. Thereafter, drying was performed, compression was performed to attain a positive electrode composite material density of 3.55 g/cm$^3$ using a roller, cutting was performed to attain a predetermined size, and an aluminum tab was attached, thereby forming a positive electrode.

[Synthesis of Second Positive Electrode Active Material]

A transition metal compound represented by $Ni_{0.60}Co_{0.20}Mn_{0.20}(OH)_2$ was mixed with LiOH, and a second positive electrode active material (lithium-nickel composite oxide with a particle size of 3 to 6 μm) was obtained through the first calcination step and the second calcination step. An average particle size D50 of the second positive electrode active material was 4.0 μm.

[Production of Positive Electrode for TG Measurement]

Mixing was performed such that positive electrode active material 1 produced in each of the Examples and the Comparative Examples had 89.0 parts by mass, carbon black serving as a conductive material had 1.0 parts by mass, and polyvinylidene difluoride (PVdF) serving as a binder had 10 parts by mass, and an appropriate amount of N-methyl-2-pyrrolidone (NMP) was further added, thereby preparing a positive electrode composite material slurry. The slurry was applied to a current collector composed of aluminum foil, thereby forming a positive electrode composite material layer. Thereafter, drying was performed, rolling was performed to attain a predetermined thickness using a roller, cutting was performed to attain a predetermined size, and an aluminum tab was attached, thereby forming a positive electrode.

[Production of Negative Electrode]

A negative electrode active material, carboxymethyl cellulose (CMC) serving as a thickener, and styrene-butadiene rubber (SBR) serving as a binder were measured in amount to attain a mass ratio of 98:1:1, and were dispersed in water, thereby preparing a negative electrode composite material slurry. The negative electrode composite material slurry was applied to a current collector composed of a copper foil, thereby forming a negative electrode composite material layer. Thereafter, drying was performed, rolling was performed to attain a predetermined thickness using a roller, cutting was performed to attain a predetermined size, and a nickel tab was attached, thereby forming a negative electrode.

[Preparation of Non-Aqueous Electrolyte]

Ethylene carbonate (EC), dimethyl carbonate (DMC) and ethyl methyl carbonate (EMC) were mixed at a volume ratio of 30:30:40. Lithium hexafluorophosphate ($LiPF_6$) was added to the mixed solvent to attain a concentration of 1.15 mol/liter. Further, vinylene carbonate (VC) was added to have an addition ratio of 1.0 mass % with respect to the total mass of this mixed solvent, thereby preparing a non-aqueous electrolyte.

[Evaluation on Crystallite Size]

A powder sample of the first positive electrode active material was introduced into a dedicated folder of a full-automatic multi-purpose X-ray diffraction device (SmartLab provided by Rigaku) and was measured by a reflection method, thereby obtaining an X-ray diffraction pattern. For a vacuum tube (target element), Cu was used, a tube voltage was 45 kV, and a tube current was 200 mA. From the measurement result, the crystallite size was calculated in accordance with the half width (d) of a crystal peak (104 plane) that appears at $2\theta=44$ to $45°$.

[Evaluation on Low-Temperature Low-SOC Output Property]

A low-temperature low-SOC output resistance was measured in the following procedure. The positive electrode for evaluation on the low-temperature output property and the negative electrode as produced above were stacked with a separator composed of polyolefin being interposed therebetween, thereby producing a stack type electrode assembly. This electrode assembly was accommodated in an exterior package composed of an aluminum laminate sheet, the non-aqueous electrolyte above was introduced thereinto, and the opening of the exterior package was then sealed, thereby obtaining a test cell. For the test cell above, constant-current charging was performed under a temperature condition of 25° C. at a current density of 0.2 mA/cm$^2$ until 4.25 V was attained, and constant-voltage charging was further performed at 4.25 V until a current density of 0.04 mA/cm$^2$ was attained, thereby finding a charging capacity. After 10 minutes of resting, constant-current discharging was performed at a current density of 0.2 mA/cm$^2$ until 3.0 V was attained, thereby finding a discharging capacity.

A temperature in a battery measurement environment was decreased to −30° C., constant-current charging was performed to the above-described cell at a current density of 0.2 mA/cm$^2$ until 3.44 V was attained, constant-voltage charging was further performed at 3.44 V until a current density of 0.04 mA/cm$^2$ was attained, constant-current discharging was then performed at a current value of 0.2 mA/cm$^2$ for 10 seconds, and a voltage at a time after passage of 10 seconds was measured. The measurement was performed at each of current densities of 0.4, 0.6, 0.8, 1.0, and 1.2 mA/cm$^2$, and a 10-second DC resistance was calculated in accordance with an inclination of current value and voltage value.

[Evaluation on Thermal Stability]
(Production of Test Cell)

The positive electrode obtained by the method of producing the positive electrode plate for TG measurement and a metal lithium were wound with a separator composed of polyolefin being interposed therebetween, thereby producing a wound electrode assembly. This electrode assembly was accommodated in an exterior package composed of an aluminum laminate sheet, the non-aqueous electrolyte above was introduced thereinto, and the opening of the exterior package was then sealed, thereby obtaining a test cell.

(Sample Production Method for TG Measurement)

For the cell, constant-current charging was performed under a temperature condition of 25° C. at a current density of 0.2 mA/cm$^2$ until 4.35 V was attained, constant-voltage charging was further performed at 4.35 V until a current density of 0.04 mA/cm$^2$ was attained, and then constant-current discharging was performed at a current density of 0.04 mA/cm$^2$ until 2.5 V was attained. After one cycle of the above-described charging/discharging conditions, constant-current charging was performed at a current density of 0.2 mA/cm$^2$ until 4.40 V was attained, and constant-voltage charging was performed at 4.40 V until a current density of 0.04 mA/cm$^2$ was attained. The cell was disassembled in a glove box, a positive electrode plate was removed, cleaning was performed with DMC, and vacuum-drying was performed.

The positive electrode composite material layer was cut away from the core body of the positive electrode plate, thereby forming a sample for TG measurement.

(TG Measurement Method)

20 mg of the sample was measured and placed on a TG pan of a measurement device (measurement by DTG-60AH provided by SHIMADZU) and therefore was set in the device. Measurement was performed under an Ar atmosphere at a temperature increase rate of 5° C./min with the upper limit of the temperature being 600° C. A weight decrease amount and a weight decrease ratio per minute at 120° C. to 600° C. were calculated.

Example 1

A transition metal compound represented by $Ni_{0.55}Co_{0.20}Mn_{0.2}(OH)_2$ was mixed with LiOH, and then the first calcination step and the second calcination step were performed, thereby obtaining a first positive electrode active material. An average particle size D50 of the first positive electrode active material was 16.0 μm, and the crystallite size is 485 Å.

Examples 2 to 7 and Comparative Examples 1 to 4

Each of first positive electrode active materials was produced in the same manner as in Example 1 except that the crystallite size was controlled by controlling parameters in the first and second calcination steps in Example 1. Results are shown in Table 1.

TABLE 1

| | Crystallite Size (Å) | Weight Decrease Amount (%) | Weight Decrease Ratio per Minute (%/min) | Low-Temperature Low-SOC Output Property (Ω) | Determination |
|---|---|---|---|---|---|
| Comparative Example 1 | 416 | 12.5 | 0.41 | 4.526 | X |
| Comparative Example 2 | 430 | 12.1 | 0.48 | 4.502 | X |
| Comparative Example 3 | 431 | 12.5 | 0.42 | 4.489 | X |
| Comparative Example 4 | 446 | 12.3 | 0.42 | 4.467 | X |
| Example 1 | 485 | 11.9 | 0.40 | 4.494 | ○ |
| Example 2 | 499 | 11.9 | 0.38 | 4.535 | ○ |
| Example 3 | 524 | 11.7 | 0.38 | 4.459 | ○ |
| Example 4 | 574 | 11.6 | 0.40 | 4.586 | ○ |
| Example 5 | 702 | 11.4 | 0.35 | 4.664 | ○ |
| Example 6 | 710 | 11.6 | 0.34 | 4.664 | ○ |
| Example 7 | 742 | 11.8 | 0.34 | 4.664 | ○ |

In Table 1, when the low-temperature low-SOC output property was 4.664 Ω or less, the weight decrease amount was 12% or less, and the weight decrease ratio per minute was 0.40%/min or less, it was determined as "○", and otherwise, it was determined as "X". In each of Examples 1 to 7 according to the present invention, both high thermal stability and improved low-temperature low-SOC output property could be attained.

Although the embodiments of the present invention have been described and illustrated in detail, it is clearly understood that the same is by way of illustration and example only and is not to be taken by way of limitation. The scope of the present invention is defined by the terms of the claims, and is intended to include any modifications within the scope and meaning equivalent to the terms of the claims.

What is claimed is:

1. A positive electrode NCM-based active material comprising an aggregated particle in which a diameter D50 of a secondary particle is 14 μm or more and 18 μm or less, wherein a crystallite size is 460 Å or more and the crystallite size is 742 Å or less, and wherein the positive electrode NCM-based active material includes at least one material selected from the group consisting of $LiNi_{0.6}Co_{0.3}Mn_{0.1}O_2$, $LiNi_{0.6}Co_{0.2}Mn_{0.2}O_2$, $LiNi_{0.6}Co_{0.1}Mn_{0.3}O_2$, and $LiNi_{0.55}Co_{0.20}Mn_{0.25}O_2$.

2. The positive electrode NCM-based active material according to claim 1, wherein the crystallite size is 580 Å or less.

3. The positive electrode NCM-based active material according to claim 1, wherein a weight decrease amount in thermal mass spectrometry at 120 to 600° C. and a temperature increase rate of 5° C./min is 12 mass % or less.

4. The positive electrode NCM-based active material according to claim 1, wherein a weight decrease ratio per minute in thermal mass spectrometry at 120 to 600° C. and a temperature increase rate of 5° C./min is 0.40 mass %/min or less.

5. A positive electrode comprising the positive electrode NCM-based active material according to claim 1.

6. A battery comprising the positive electrode according to claim 5.

* * * * *